(12) United States Patent
Chung

(10) Patent No.: US 7,334,576 B2
(45) Date of Patent: Feb. 26, 2008

(54) BARBECUE GRILL HAVING A TEMPERATURE DETECTION FUNCTION

(76) Inventor: Kiosky Chung, 8F-1, No. 497, Jhongming S. Rd., West District, Taichung City (TW) 403

( * ) Notice: Subject to any disclaimer, the term of this patent is extended or adjusted under 35 U.S.C. 154(b) by 427 days.

(21) Appl. No.: 11/139,386

(22) Filed: May 27, 2005

(65) Prior Publication Data

US 2006/0266344 A1 Nov. 30, 2006

(51) Int. Cl.
*F24B 3/00* (2006.01)
*A47J 37/00* (2006.01)
*F23L 3/00* (2006.01)

(52) U.S. Cl. ............... 126/25 R; 126/41 R; 126/215; 126/9 R

(58) Field of Classification Search .......... 126/25 R, 126/85 R, 211
See application file for complete search history.

(56) References Cited

U.S. PATENT DOCUMENTS 6,035,768 A * 3/2000 Kaufman .................. 99/449

* cited by examiner

*Primary Examiner*—Terrence Till
*Assistant Examiner*—Nikhil Mashruwala
(74) *Attorney, Agent, or Firm*—Banger Shia

(57) ABSTRACT

A barbecue grill includes a lid, and a temperature detection device mounted on the lid. The temperature detection device includes a movable plate, a control handle, and a temperature detector. Thus, the temperature probe of the temperature detector is extended into the inside of the lid to detect the temperature in the inside of the lid so as to facilitate a user monitoring the temperature in the inside of the lid, thereby preventing the food contained in the lid from being broiled too excessively.

12 Claims, 6 Drawing Sheets

US 7,334,576 B2

BARBECUE GRILL HAVING A TEMPERATURE DETECTION FUNCTION

BACKGROUND OF THE INVENTION

1. Field of the Invention

The present invention relates to a barbecue grill, and more particularly to a barbecue grill having a temperature detection function.

2. Description of the Related Art

A conventional barbecue grill is used to broil food and comprises a main body, a cooking grid mounted in the main body, and a lid pivotally mounted on the main body. Thus, when the lid covers the main body, the lid and the main body form a closed space to facilitate the cooking grid broiling and cooking the food. However, the user cannot detect the temperature inside of the main body and the lid, so that he has to remove the lid from the main body frequently so as to check if the food has been cooked already, thereby causing inconvenience to the user, and thereby decreasing the broiling and cooking efficiency of the barbecue grill.

SUMMARY OF THE INVENTION

The present invention is to mitigate and/or obviate the disadvantage of the conventional barbecue grill.

The primary objective of the present invention is to provide a barbecue grill having a temperature detection and regulation function.

Another objective of the present invention is to provide a barbecue grill, wherein the temperature probe of the temperature detector is extended into the inside of the lid to detect the temperature in the inside of the lid so as to facilitate a user monitoring the temperature in the inside of the lid, thereby preventing the food contained in the lid from being broiled too excessively.

A further objective of the present invention is to provide a barbecue grill, wherein each of the air vents of the movable plate is movable to align with a respective one of the air vents of the lid partially or completely to change the air flow rate of the air vents of the lid so as to regulate the temperature in the inside of the lid.

A further objective of the present invention is to provide a barbecue grill, wherein each of the air vents of the movable plate is movable to separate from a respective one of the air vents of the lid so as to close the air vents of the lid completely to produce an air seal effect, thereby increasing the temperature in the lid rapidly.

In accordance with the present invention, there is provided a barbecue grill, comprising a lid, and a temperature detection device mounted on the lid, wherein:

the lid has a top face;

the temperature detection device includes a movable plate movably mounted on an inner side of the top face of the lid, a control handle movably mounted on an outer side of the top face of the lid and connected to the movable plate for moving the movable plate, and a temperature detector mounted on the control handle and having a temperature probe extended into an inside of the lid.

Further benefits and advantages of the present invention will become apparent after a careful reading of the detailed description with appropriate reference to the accompanying drawings.

DETAILED DESCRIPTION OF THE INVENTION

Figure 1:
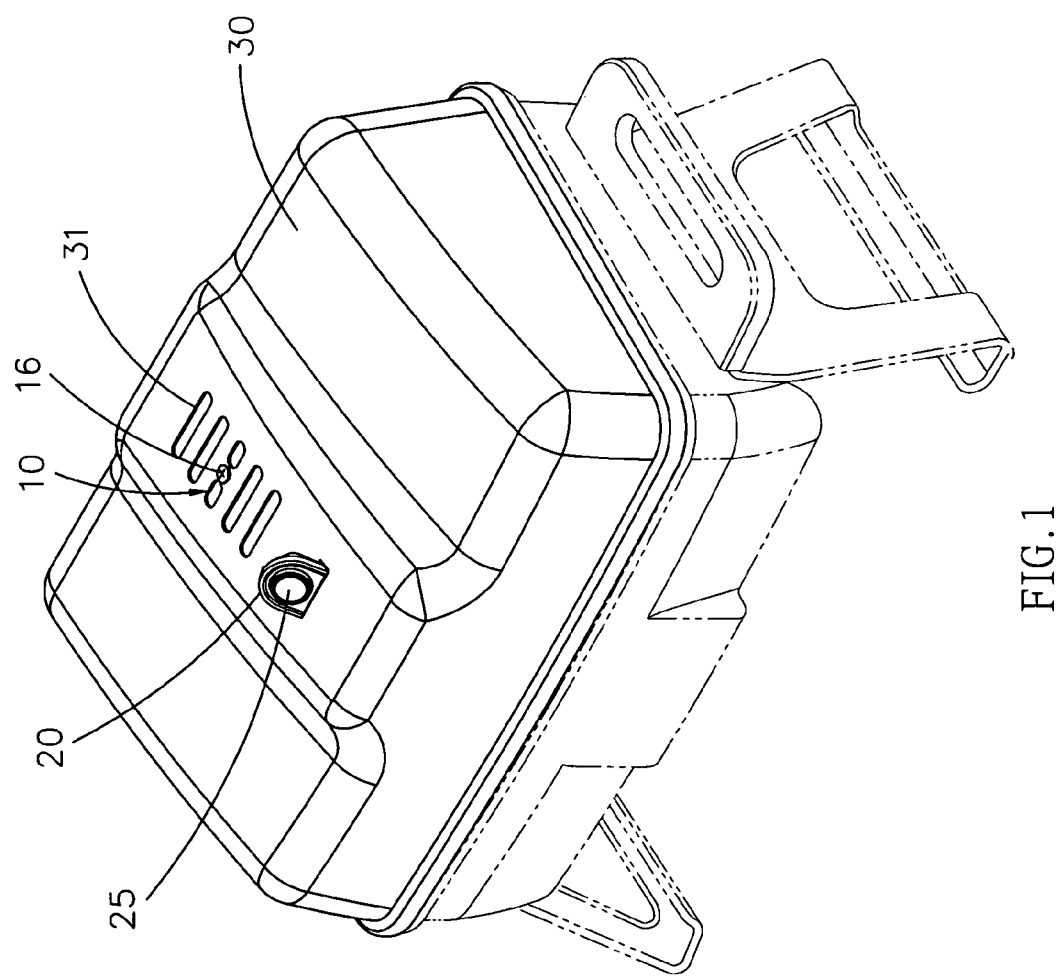
FIG. 1 is a perspective view of a barbecue grill in accordance with the preferred embodiment of the present invention.
Figure 2:
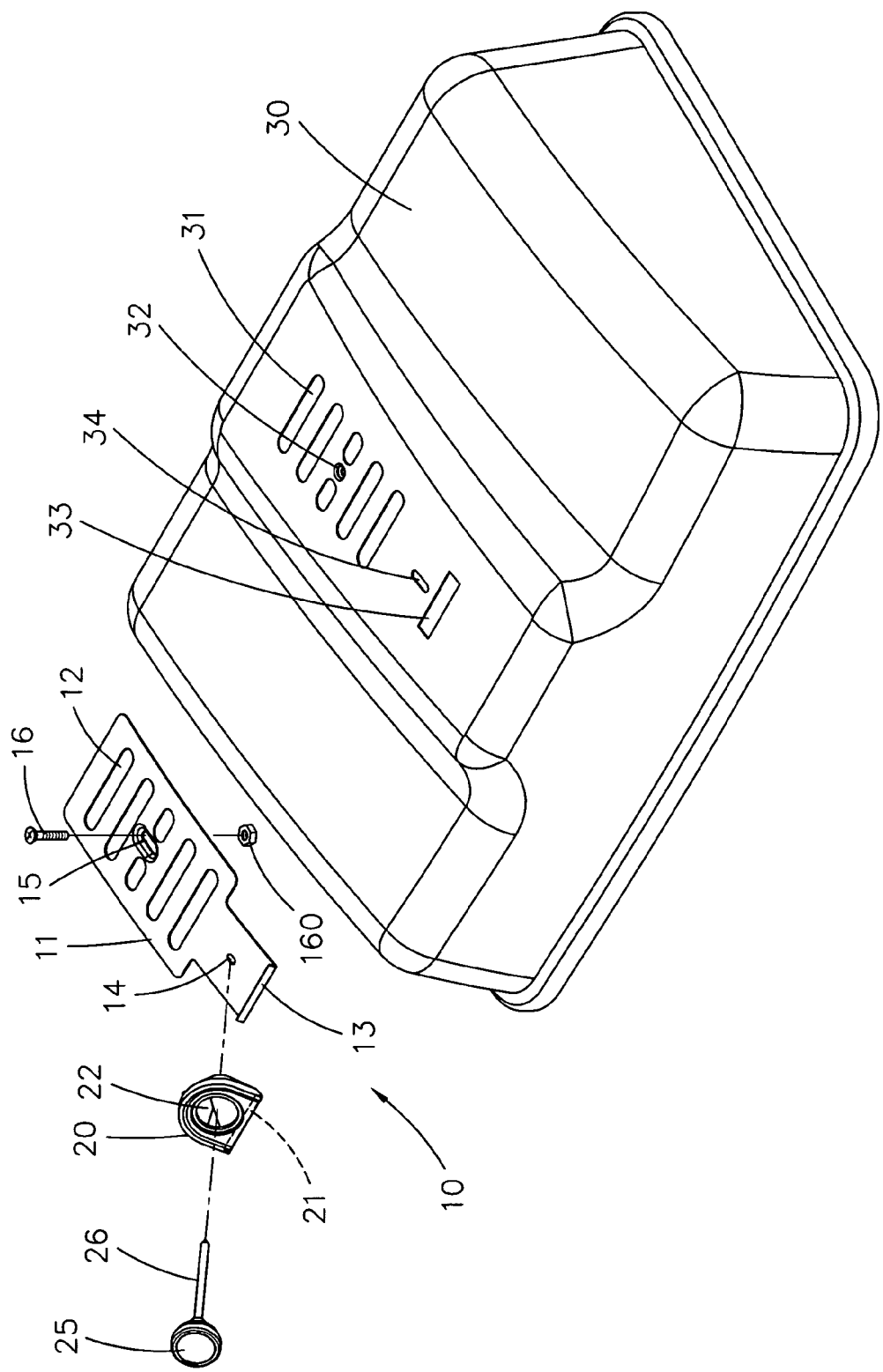
FIG. 2 is an exploded perspective view of the barbecue grill as shown in FIG. 1.
Figure 3:
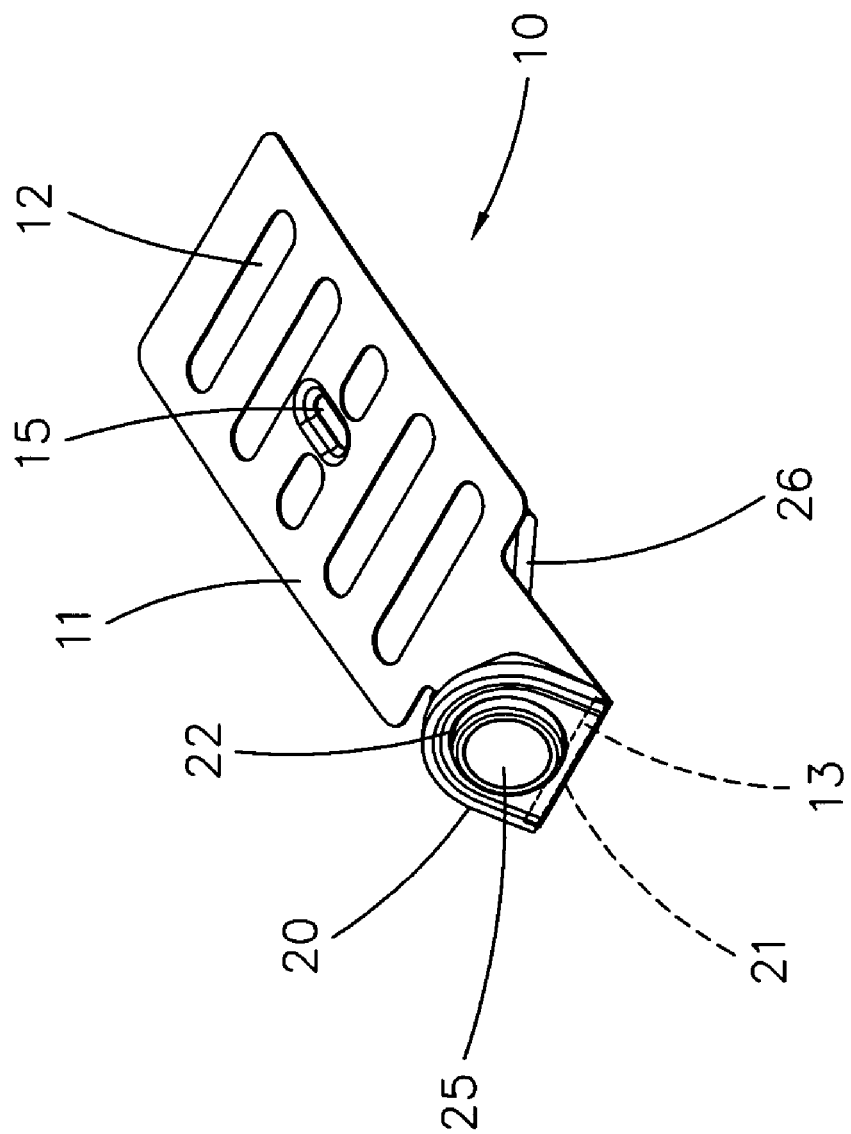
FIG. 3 is a perspective view of a temperature detection device of the barbecue grill in accordance with the preferred embodiment of the present invention.

Referring to the drawings and initially to FIGS. 1-5, a barbecue grill in accordance with the preferred embodiment of the present invention comprises a lid 30, and a temperature detection device 30 mounted on the lid 30.

The lid 30 has a top face formed with a plurality of air vents 31, an elongated guide slot 34 and a slide slot 33. The top face of the lid 30 has a mediate portion formed with a substantially arc-shaped slide block 32 extending downward therefrom.

The temperature detection device 30 includes a movable plate 11 movably mounted on an inner side of the top face of the lid 30, a control handle 20 movably mounted on an outer side of the top face of the lid 30 and connected to the movable plate 11 for moving the movable plate 11, and a temperature detector 25 mounted on the control handle 20 and having a temperature probe 26 extended through the control handle 20, the movable plate 11 and the top face of the lid 30 and extended into an inside of the lid 30.

The control handle 20 of the temperature detection device 30 has an inside formed with a mounting hole 22 for mounting the temperature detector 25 and has a side formed with a locking groove 21.

The movable plate 11 of the temperature detection device 30 is formed with a plurality of air vents 12 each movable to align with a respective one of the air vents 31 of the lid 30. The movable plate 11 of the temperature detection device 30 has a distal end formed with an upward bent locking piece 13 extended through the slide slot 33 of the lid 30 and locked in the locking groove 21 of the control handle 20 so that the control handle 20 is secured to the movable plate 11. Preferably, the locking piece 13 of the movable plate 11 is movably mounted in the slide slot 33 of the lid 30. The distal end of the movable plate 11 is formed with a through hole 14, and the temperature probe 26 of the temperature detector 25 is extended through the through hole 14 of the movable plate 11 and movably mounted in the guide slot 34 of the lid 30.

The movable plate 11 of the temperature detection device 30 has a mediate portion formed with a substantially arc-shaped slideway 15 to receive the slide block 32 of the lid 30 so that the slide block 32 of the lid 30 is slidable in the slideway 15 of the movable plate 11 when the movable plate 11 is movable relative to the lid 30. The temperature detection device 30 further includes a locking screw 16 extended through the slide block 32 of the lid 30 and the slideway 15 of the movable plate 11 and rested on the lid 30, and a locking nut 160 screwed onto the locking screw 16 and rested on the movable plate 11 to attach the movable plate 11 to the lid 30.

Figure 4:
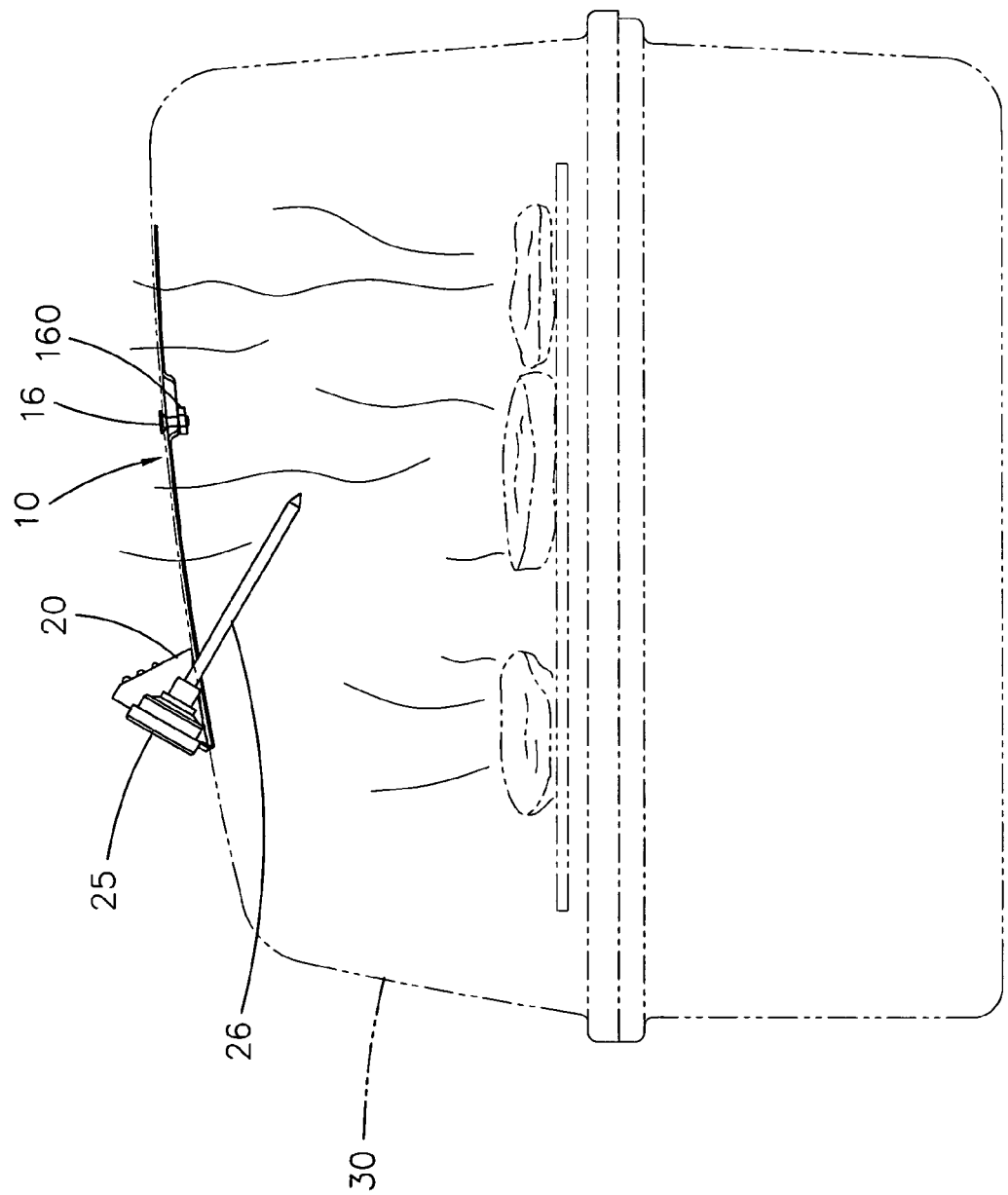
FIG. 4 is a side plan cross-sectional view of the barbecue grill as shown in FIG. 1.

As shown in FIG. 4, the temperature probe 26 of the temperature detector 25 is extended into the inside of the lid 30 to detect the temperature in the inside of the lid 30 so as to facilitate a user monitoring the temperature in the inside of the lid 30, thereby preventing the food contained in the lid 30 from being broiled too excessively.

Figure 5:
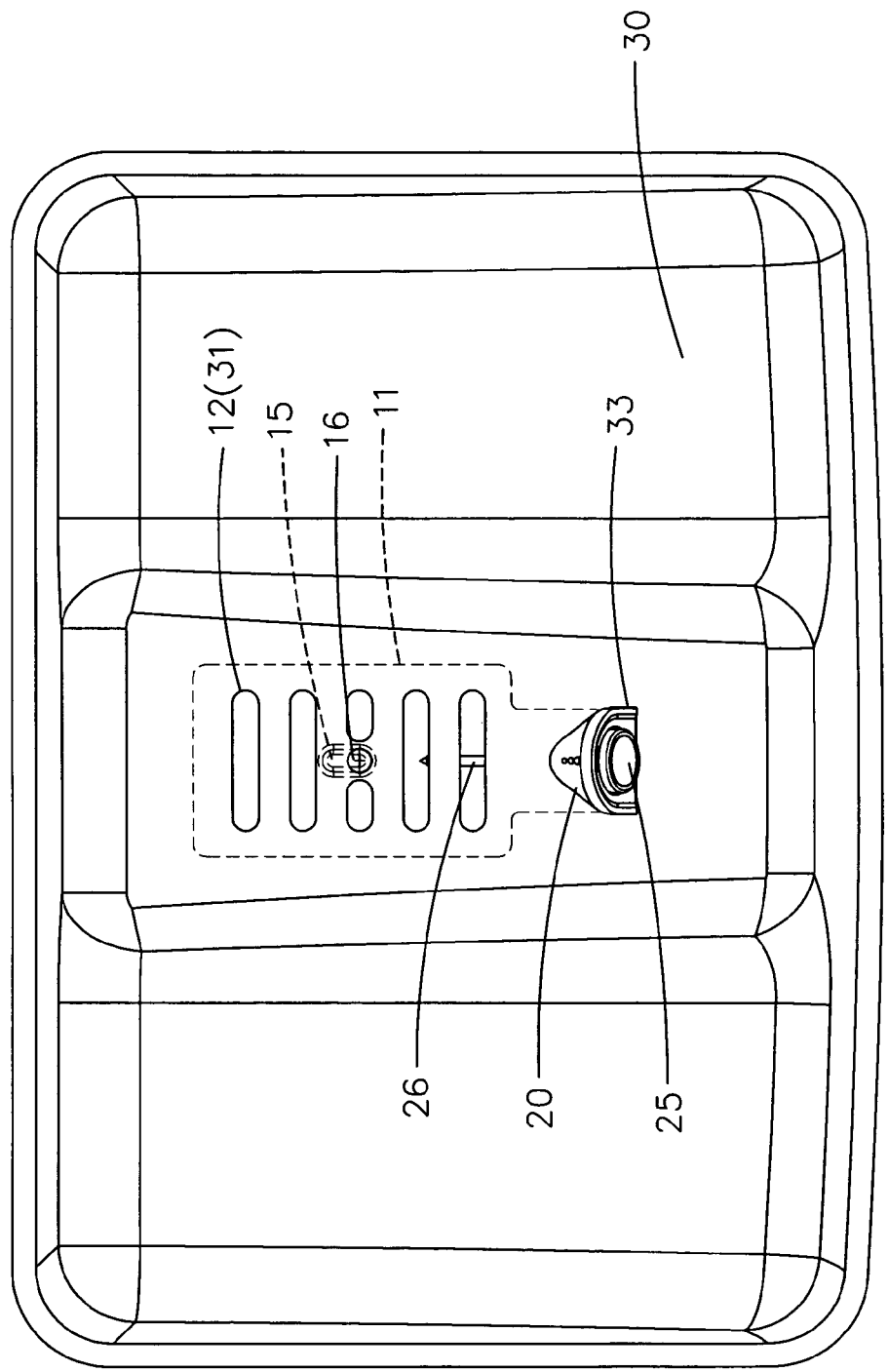
FIG. 5 is a top plan view of the barbecue grill as shown in FIG. 1.

As shown in FIG. 5, when the control handle 20 is driven by the user to move the movable plate 11, the movable plate 11 is movable relative to the lid 30 so that each of the air vents 12 of the movable plate 11 aligns with a respective one of the air vents 31 of the lid 30 partially or completely so as to open the air vents 31 of the lid 30 partially or completely, thereby enhancing the ventilating effect of the lid 30.

Figure 6:
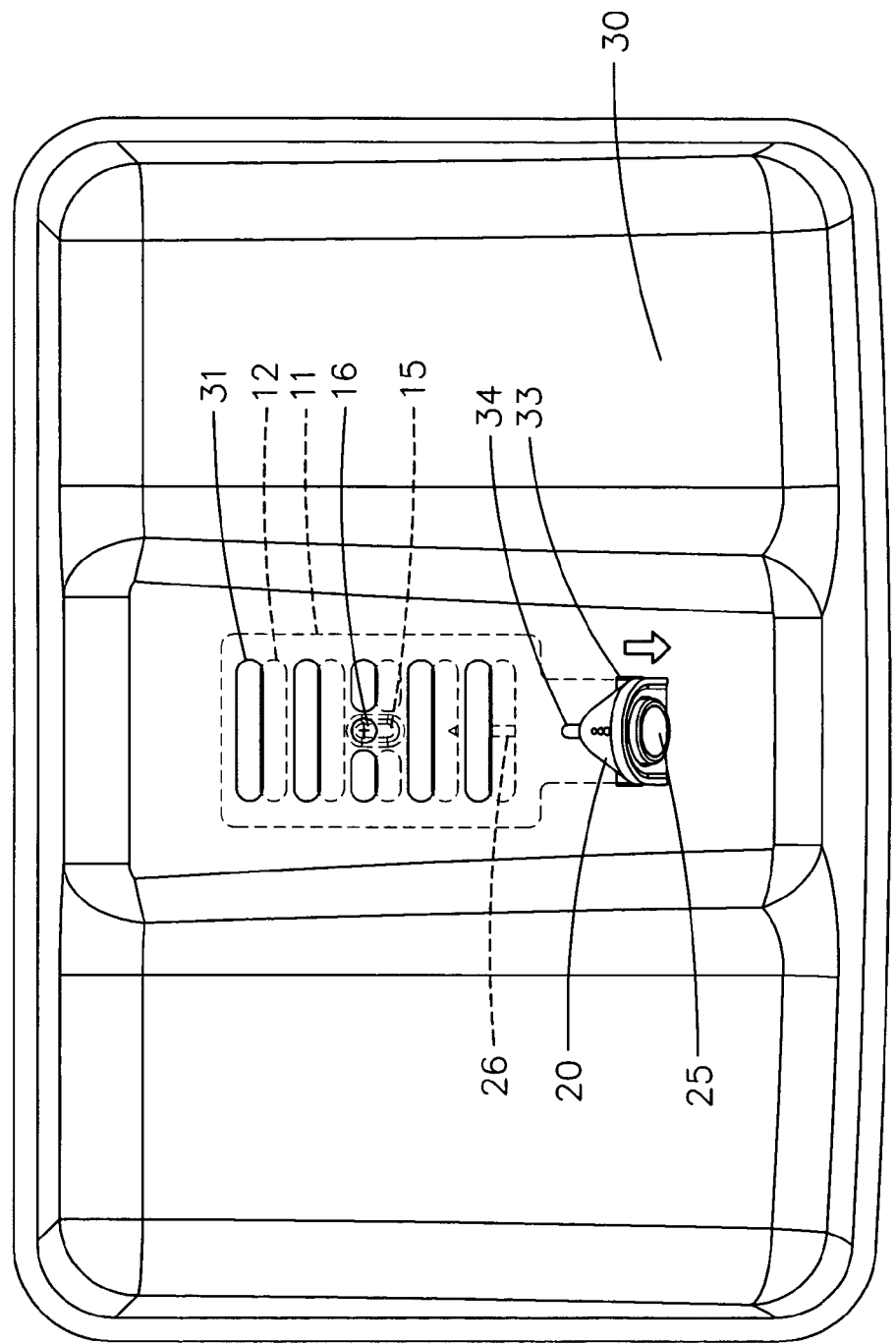
FIG. 6 is a schematic operational view of the barbecue grill as shown in FIG. 5.

As shown in FIG. 6, when the control handle 20 is driven by the user to move the movable plate 11, the movable plate 11 is movable relative to the lid 30 so that each of the air vents 12 of the movable plate 11 is separated from a respective one of the air vents 31 of the lid 30 so as to close the air vents 31 of the lid 30 completely to produce an air seal effect, thereby increasing the temperature in the lid 30 rapidly.

Accordingly, the temperature probe 26 of the temperature detector 25 is extended into the inside of the lid 30 to detect the temperature in the inside of the lid 30 so as to facilitate a user monitoring the temperature in the inside of the lid 30, thereby preventing the food contained in the lid 30 from being broiled too excessively. In addition, each of the air vents 12 of the movable plate 11 is movable to align with a respective one of the air vents 31 of the lid 30 partially or completely to change the air flow rate of the air vents 31 of the lid 30 so as to regulate the temperature in the inside of the lid 30. Further, each of the air vents 12 of the movable plate 11 is movable to separate from a respective one of the air vents 31 of the lid 30 so as to close the air vents 31 of the lid 30 completely to produce an air seal effect, thereby increasing the temperature in the lid 30 rapidly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A barbecue grill, comprising a lid, and a temperature detection device mounted on the lid, wherein:
   the lid has a top face;
   the temperature detection device includes a movable plate movably mounted on an inner side of the top face of the lid, a control handle movably mounted on an outer side of the top face of the lid and connected to the movable plate for moving the movable plate, and a temperature detector mounted on the control handle and having a temperature probe extended into an inside of the lid.

2. The barbecue grill in accordance with claim 1, wherein the temperature probe of the temperature detector is extended through the control handle, the movable plate and the top face of the lid.

3. The barbecue grill in accordance with claim 1, wherein the top face of the lid is formed with a plurality of air vents, and the movable plate of the temperature detection device is formed with a plurality of air vents each movable to align with a respective one of the air vents of the lid.

4. The barbecue grill in accordance with claim 3, wherein each of the air vents of the movable plate is movable to align with a respective one of the air vents of the lid partially or completely to change an air flow rate of the air vents of the lid so as to regulate a temperature in the inside of the lid.

5. The barbecue grill in accordance with claim 3, wherein each of the air vents of the movable plate is movable to separate from a respective one of the air vents of the lid to close the air vents of the lid completely to produce an air seal effect, thereby increasing the temperature in the lid.

6. The barbecue grill in accordance with claim 1, wherein the control handle of the temperature detection device has an inside formed with a mounting hole for mounting the temperature detector.

7. The barbecue grill in accordance with claim 1, wherein the top face of the lid is formed with a slide slot, the control handle of the temperature detection device has a side formed with a locking groove, and the movable plate of the temperature detection device has a distal end formed with an upward bent locking piece extended through the slide slot of the lid and locked in the locking groove of the control handle so that the control handle is secured to the movable plate.

8. The barbecue grill in accordance with claim 7, wherein the locking piece of the movable plate is movably mounted in the slide slot of the lid.

9. The barbecue grill in accordance with claim 1, wherein the movable plate of the temperature detection device has a distal end formed with a through hole, and the temperature probe of the temperature detector is extended through the through hole of the movable plate.

10. The barbecue grill in accordance with claim 1, wherein the top face of the lid is formed with an elongated guide slot, and the temperature probe of the temperature detector is movably mounted in the guide slot of the lid.

11. The barbecue grill in accordance with claim 1, wherein the top face of the lid has a mediate portion formed with a substantially arc-shaped slide block extending downward therefrom, and the movable plate of the temperature detection device has a mediate portion formed with a substantially arc-shaped slideway to receive the slide block of the lid so that the slide block of the lid is slidable in the slideway of the movable plate when the movable plate is movable relative to the lid.

12. The barbecue grill in accordance with claim 11, wherein the temperature detection device further includes a locking screw extended through the slide block of the lid and the slideway of the movable plate and rested on the lid, and a locking nut screwed onto the locking screw and rested on the movable plate to attach the movable plate to the lid.

* * * * *